United States Patent
Chaix et al.

(10) Patent No.: US 9,841,241 B2
(45) Date of Patent: Dec. 12, 2017

(54) MECHANICAL-THERMAL STRUCTURE SUITABLE FOR A SPACE ENVIRONMENT

(71) Applicant: THALES, Neuilly-sur-Seine (FR)

(72) Inventors: Alain Chaix, Mandelieu-la-Napoule (FR); Silvain LeGrand, Nice (FR); Christian Masse, La Cannet (FR)

(73) Assignee: Thales, Courbevoie (FR)

(*) Notice: Subject to any disclaimer, the term of this patent is extended or adjusted under 35 U.S.C. 154(b) by 805 days.

(21) Appl. No.: 14/033,211

(22) Filed: Sep. 20, 2013

(65) Prior Publication Data

US 2014/0083651 A1  Mar. 27, 2014

(30) Foreign Application Priority Data

Sep. 21, 2012  (FR) .................................. 12 02503

(51) Int. Cl.
| | | |
|---|---|---|
| *F28F 7/00* | (2006.01) | |
| *F28D 15/02* | (2006.01) | |
| *F28F 23/00* | (2006.01) | |
| *B23P 15/26* | (2006.01) | |
| *B64G 1/50* | (2006.01) | |
| *B33Y 80/00* | (2015.01) | |

(52) U.S. Cl.
CPC .............. *F28D 15/02* (2013.01); *B23P 15/26* (2013.01); *B64G 1/50* (2013.01); *B64G 1/503* (2013.01); *F28F 23/00* (2013.01); *B33Y 80/00* (2014.12); *Y10T 29/49353* (2015.01)

(58) Field of Classification Search
CPC . F28D 15/02; F28F 23/00; B64G 1/50; B64G 1/503; B64G 1/506; Y10T 29/49353
USPC ... 165/80.4, 104.19, 104.21, 104.26, 104.33, 165/133
See application file for complete search history.

(56) References Cited

U.S. PATENT DOCUMENTS

| | | | | |
|---|---|---|---|---|
| 4,388,964 A | * | 6/1983 | Almgren et al. | B64G 1/50 165/103 |
| 4,675,783 A | * | 6/1987 | Murase et al. | F28D 15/0275 165/104.14 |
| 4,793,404 A | * | 12/1988 | Hata | B21C 23/22 138/140 |
| 6,065,529 A | * | 5/2000 | Antoniuk et al. | B64G 1/50 165/104.26 |
| 8,569,848 B2 | * | 10/2013 | Chang et al. | F28F 13/06 257/414 |
| 2006/0219689 A1 | | 10/2006 | Huang et al. | |
| 2006/0234056 A1 | * | 10/2006 | Huang et al. | H01L 23/373 428/408 |
| 2007/0040702 A1 | * | 2/2007 | Mosher et al. | B64G 1/10 340/943 |
| 2008/0128116 A1 | * | 6/2008 | Dangelo et al. | F28D 15/046 165/104.21 |

(Continued)

FOREIGN PATENT DOCUMENTS

| | | |
|---|---|---|
| EP | 2388195 A1 | 11/2011 |
| JP | 200422603 A | 1/2004 |
| WO | 2012082805 A2 | 6/2012 |

*Primary Examiner* — Claire Rojohn, III
(74) *Attorney, Agent, or Firm* — Baker Hostetler LLP

(57) ABSTRACT

A monolithic mechanical-thermal structure which is suitable for a space environment is provided, in which the structure contains at least one hole. The walls of the hole are lined with filaments. The monolithic mechanical-thermal structure may be made of metal. And a process for manufacturing the structure is also provided.

12 Claims, 1 Drawing Sheet

(56) References Cited

U.S. PATENT DOCUMENTS

| | | | | |
|---|---|---|---|---|
| 2009/0237886 A1* | 9/2009 | Iwai et al. | ............ | H01L 23/373 361/708 |
| 2010/0021736 A1* | 1/2010 | Slinker et al. | .......... | F28F 13/00 428/408 |
| 2010/0124025 A1* | 5/2010 | Yamaguchi et al. | .. | H01L 23/373 361/708 |
| 2010/0181060 A1* | 7/2010 | Kobayashi | ............ | H01L 23/373 165/185 |
| 2011/0090650 A1* | 4/2011 | Oda | ...................... | H01L 23/373 361/717 |
| 2011/0120674 A1* | 5/2011 | MacDonald et al. | . | F28D 15/046 165/104.26 |
| 2011/0316173 A1* | 12/2011 | Patti et al. | ............. | B82Y 10/00 257/784 |
| 2012/0125571 A1* | 5/2012 | Lutz et al. | ............ | B64G 1/503 165/104.21 |
| 2012/0236502 A1* | 9/2012 | Yamaguchi et al. | .. | H01L 23/373 361/704 |
| 2013/0049040 A1* | 2/2013 | Ramer et al. | ........... | H01L 33/50 257/98 |
| 2013/0094909 A1* | 4/2013 | McAlister | ................ | E02D 3/11 405/130 |

* cited by examiner

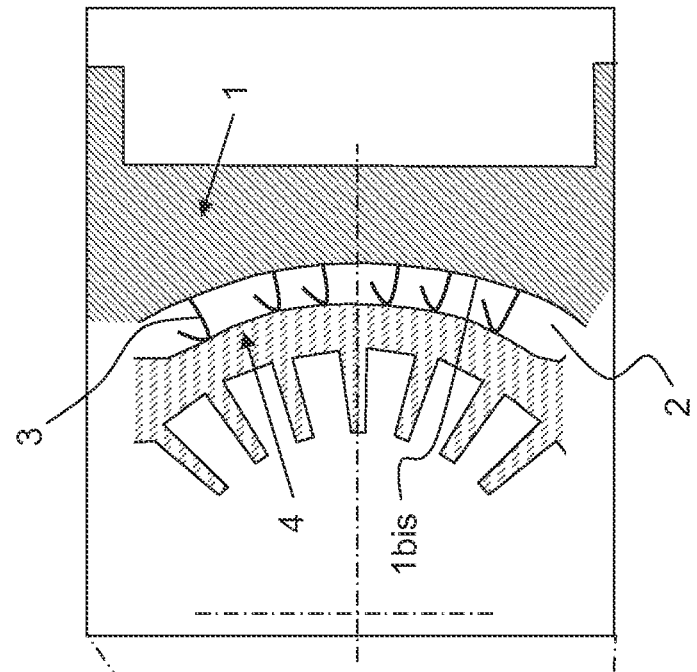
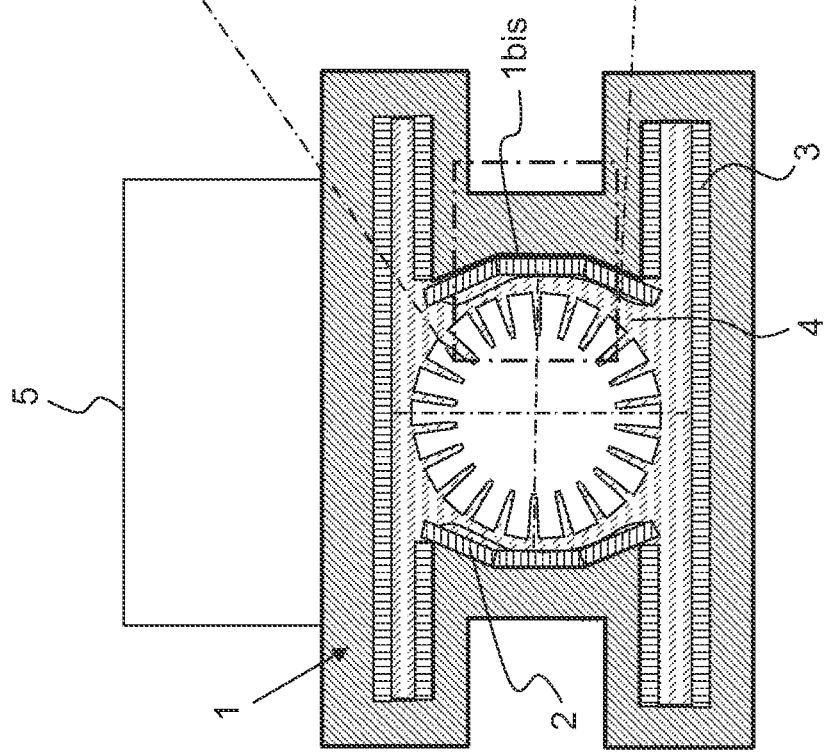

MECHANICAL-THERMAL STRUCTURE SUITABLE FOR A SPACE ENVIRONMENT

CROSS-REFERENCE TO RELATED APPLICATION

This application claims priority to foreign French patent application No. FR 1202503, filed on Sep. 21, 2012, the disclosure of which is incorporated by reference in its entirety.

FIELD OF THE INVENTION

The field of the invention relates to mechanical-thermal structures suitable for a space environment and, more particularly, to mechanical-thermal structures bearing thermal energy dissipating elements requiring heat pipes for thermal control. However, the invention is likewise suitable for terrestrial applications.

BACKGROUND

It is well known for mechanical-thermal structures comprising heat pipes to be used to cool heat-dissipating devices. A heat pipe containing a coolant recovers the heat released by a dissipating device at one of these ends, the coolant evaporates and condenses at the other end, releasing the heat to the mechanical-thermal structure, which dissipates it into the ambient environment; in this case, the ambient environment is space.

According to the prior art, heat pipes are realized using the same materials as the mechanical-thermal structures in which they are integrated. This kind of strategy avoids the problems associated with different expansion coefficients, which produce zones of mechanical stress which risk damaging the structure. However, this strategy limits the choice of materials, which affects the performance of the device making up the mechanical-thermal structure in terms of mass. Moreover, the production of mechanical-thermal structures is based on standard manufacturing methods such as machining, milling, adhesive bonding or screwing. This kind of standard production necessitates a large number of parts which are complex to assemble and require manufacturing constraints which are difficult to observe. The devices produced in this way have an increased mass and are particularly costly.

U.S. Pat. No. 6,065,529 proposes a first solution involving the realization of a channel in the mechanical-thermal structure intended to receive a heat pipe. The inside dimensions of the channel are greater than the outside dimensions of the heat pipe, thereby leaving a gap between the inside wall of the channel and the outside wall of the heat pipe, said gap being filled with a heat conductive fluid or metal powder. The gap between the inside wall of the channel and the outside wall of the pipe thereby allows the material from which the heat pipe is made to expand and contract without generating mechanical stresses on the materials of the mechanical-thermal structure.

The advantage of this first solution is that it solves the problems associated with differences in the thermal expansion coefficient of the materials, which allows greater latitude in relation to the choice of materials used. However, this solution does not solve the problems involved in producing the mechanical-thermal structure in terms of cost.

SUMMARY OF THE INVENTION

In this context, the invention proposes the production of a monolithic mechanical-thermal structure allowing heat pipes to be easily inserted.

According to one aspect of the invention, a monolithic metal mechanical-thermal structure is proposed which is suitable for a space environment and contains at least one hole. The hole comprises walls lined with filaments. Advantageously, there are between 30 and 100 filaments per square centimeter.

The mechanical-thermal structure proposed by the invention eliminates the assembly difficulties and reduces the costs of realizing the structure.

Advantageously, the percentage of wall surface covered with filaments is between 10 and 50%.

Advantageously, the length of the filament is between 0.2 and 5 mm.

Advantageously, the diameter of the filaments is between 0.3 and 0.8 mm.

Advantageously, the hole in the mechanical-thermal structure contains a pipe.

According to one aspect of the invention, the hole in the mechanical-thermal structure contains a pipe and the filaments are greater in length than a distance separating the outside of the pipe from the inside of the hole, such that they bend when the pipe is introduced. Advantageously, the walls of the hole are covered with thermal grease.

The filaments are in contact with the heat pipe, which allows the transfer of thermal energy from the pipe to the mechanical-thermal structure.

According to one aspect of the invention, the structure comprises aluminum. Aluminum constitutes an excellent compromise between mass and thermal conductivity. It is a material of choice for mechanical-thermal structures intended for space applications.

The heat pipe is advantageously a heat pipe for liquid ammonia, commonly used in space applications, the liquid ammonia heat pipe being highly effective thermally and low in cost.

According to another aspect of the invention, a process for producing the mechanical-thermal structure is proposed, as previously described, comprising a first stage of manufacturing the mechanical-thermal structure by an additive manufacturing method, a second stage of manufacturing the pipe and a third stage of inserting the heat pipe inside the hole in the mechanical-thermal structure. The pipe is advantageously realized by an extrusion method. The process for producing the mechanical-thermal structure advantageously comprises a stage of coating the walls of the hole in the structure with grease.

This production process allows the number of parts to be assembled to be limited and the costs of manufacturing the mechanical-thermal structure to be reduced.

BRIEF DESCRIPTION OF THE DRAWINGS

The invention will be better understood by studying some embodiments described by way of example and in no way intended to be exhaustive which are illustrated in the attached drawings in which:

FIG. 1 represents a mechanical-thermal structure according to one aspect of the invention and FIG. 2 represents an enlargement of the boxed area depicted in FIG. 1.

DETAILED DESCRIPTION

FIG. 1 illustrates a mechanical-thermal structure 1 intended to be integrated in a radiator panel with integrated heat pipes, for example, for which heat pipes are necessary for thermal control.

The mechanical-thermal structure 1 is made up of a unique material exhibiting a low coefficient of thermal elasticity, in which case the mechanical-thermal structure 1 comprises aluminum.

The mechanical-thermal structure 1 exhibits a hole 2, the walls 1bis of the hole 2 being lined with filaments 3. In this case, all the walls 1bis of the hole 2 are lined with filaments 3. Alternatively, only certain walls are lined with filaments. The entire mechanical-thermal structure 1 is monolithic, in other words the structure 1 and the filaments 3 constitute a single part. A pipe 4 is inserted inside the hole 2 in the structure 1.

In this case, the hole 2 exhibits a form as is represented in FIG. 1. Alternatively, the hole 2 exhibits a shape adapted to the pipe 4 which must be inserted therein. The hole 2 may naturally be open-ended or blind.

The pipe 4 comprises aluminum, this material exhibiting a low expansion coefficient and good thermal conductivity. The profile of the pipe 4 may be circular or indented, so as to increase the exchange surface. The pipe 4 is produced by a standard method, extrusion for example.

Advantageously, the mechanical-thermal structure 1 is associated with heat dissipating equipment 5.

Hence, the thermal energy emitted by the dissipating equipment 5 is transferred to the associated mechanical-thermal structure 1. The heat transmitted to the mechanical-thermal structure 1 is transferred via filaments 3 to the heat pipe 4. In this case, the heat pipe 4 is a liquid ammonia heat pipe. The liquid ammonia contained in the heat pipe 4 is evaporated close to the dissipating equipment 5, the liquid ammonia condenses at a distance from the dissipating equipment 5 and transfers thermal energy to the mechanical-thermal structure 1, which dissipates the thermal energy into its environment, in this case, space.

FIG. 2 represents an enlargement of the boxed area in FIG. 1. FIG. 2 illustrates a portion of the hole 2, the walls 1bis of the hole 2 being lined with filaments 3, allowing the transfer of thermal energy between the pipe 4 and the walls of the hole 2.

Advantageously, the gap between the external dimensions of the pipe 4 and the internal dimensions of the walls 1bis of the hole 2 falls between 0.1 and 2.5 mm.

Typically, the walls 1bis of the hole 2 comprise between 30 and 100 filaments per cm$^2$.

According to one embodiment of the invention, a filament 3 measuring 0.3 mm in diameter may be separated from another filament 3 by a gap of between 0.5 and 0.8 mm in both directions.

Advantageously, the filament 3 is cylindrical in shape. Alternatively, the filament 3 is parallelepipedal in shape or cylindrical at its base and flattened in the zone of contact with the heat pipe.

The filaments 3 exhibit a length of between 0.2 mm and 5 mm and a diameter of between 0.3 and 0.8 mm.

Advantageously, the percentage of wall 1bis surface covered with filament is between 10 and 50%.

When the pipe 4 is inserted inside the hole 2, the filaments 3 bend over half their length, which increases the thermal exchange surface between the pipe 4 and the structure 1 via the filaments 3. Advantageously, the walls 1bis of the hole 2 lined with filaments 3 are covered with thermal grease, further increasing the thermal exchange surface between the pipe 4 and the structure 1.

According to another aspect of the invention, the mechanical-thermal structure 1 as described previously is produced from a process comprising a first stage of manufacturing the mechanical-thermal structure 1, a second stage of manufacturing the pipe 4 and a third stage of inserting the pipe 4 in the hole 2 in the mechanical-thermal structure. The method of manufacturing the mechanical-thermal structure 1 is additive manufacturing.

This method is an additive manufacturing process involving the selective fusion of powder deposited layer by layer. After each layer is deposited, a laser beam selectively melts the powder, so as to construct the profile of the required part. The deposits thereby achieved are kept in an inert atmosphere, in order to avoid oxidation of the metal layers. This process, coupled with a model achieved by computer-aided design or CAD, makes it possible to implement the direct laser manufacturing process, which enables relatively complex functional parts to be produced. This production technique makes it possible to realize the structure 1 as described previously exhibiting a hole 2 and extremely fine, numerous filaments on the walls 1bis of the hole 2, allowing the transfer of thermal energy between the pipe 4 and the structure 1.

The invention claimed is:

1. A system to transfer heat suitable for a space environment, the system comprising:
    a monolithic metal mechanical-thermal structure, comprising: at least one hole, said hole comprising walls lined with filaments, the structure and the filaments constituting a single part made of the same material, a filament of the filaments having a first end fixed to the wall and a second end left free, a length of the filament being between 0.2 and 5 mm and a diameter of the filament being between 0.3 and 0.8 mm; and
    a pipe inserted in the hole, the filaments being greater in length than a distance separating an outside of the pipe from an inside of the hole, the filaments bending in response to the pipe being inserted into the hole and the filaments contacting the pipe, wherein heat is transmitted from the monolithic metal mechanical-thermal structure via the filaments to the pipe.

2. The system according to claim 1, in which the filaments are greater in length than a distance separating an outside of the pipe from an inside of the hole, such that the filaments bend when the pipe is introduced.

3. The system according to claim 2, in which the pipe is a liquid ammonia heat pipe.

4. The system according to claim 1, in which the pipe is a liquid ammonia heat pipe.

5. The system according to claim 1, in which the walls comprise between 30 and 100 filaments per square centimeter.

6. The system according to claim 1, in which a percentage of the wall surface covered with filaments is between 10 and 50%.

7. The system according to claim 1, in which the mechanical-thermal structure comprises aluminum.

8. The system according to claim 1, in which the walls are covered with grease, allowing better thermal conduction.

9. A process for producing the system according to claim 1, further comprising a first stage of manufacturing the mechanical-thermal structure by an additive manufacturing method, a second stage of manufacturing the pipe and a third stage of inserting a heat pipe inside the hole in the mechanical-thermal structure.

10. The process according to claim 9, in which the pipe is manufactured by an extrusion method.

11. The process according to claim 10, further comprising a stage of coating the walls of the hole in the mechanical-thermal structure with grease.

12. The process according to claim 9, further comprising a stage of coating the walls of the hole in the mechanical-thermal structure with grease.

\* \* \* \* \*